(12) United States Patent
Lehmann

(10) Patent No.: US 9,747,884 B2
(45) Date of Patent: Aug. 29, 2017

(54) BATTERY-EQUIPPED CELLULAR TELEPHONE CASE WITH INTERNAL SOUND GENERATOR AND LAYERED SOUND BLOCKAGE FOR PRIVACY

(71) Applicant: Harry V Lehmann, Novato, CA (US)

(72) Inventor: Harry V Lehmann, Novato, CA (US)

(73) Assignee: Green Swan, Inc., Novato, CA (US)

( * ) Notice: Subject to any disclaimer, the term of this patent is extended or adjusted under 35 U.S.C. 154(b) by 0 days.

(21) Appl. No.: 14/876,625

(22) Filed: Oct. 6, 2015

(65) Prior Publication Data
US 2016/0098983 A1  Apr. 7, 2016

Related U.S. Application Data

(60) Provisional application No. 62/060,111, filed on Oct. 6, 2014.

(51) Int. Cl.
| | |
|---|---|
| *H04M 1/02* | (2006.01) |
| *G10K 11/175* | (2006.01) |
| *H04B 1/3888* | (2015.01) |
| *G10K 11/16* | (2006.01) |
| *G10K 11/178* | (2006.01) |
| *H04M 1/04* | (2006.01) |

(52) U.S. Cl.
CPC ............ *G10K 11/175* (2013.01); *G10K 11/16* (2013.01); *G10K 11/1788* (2013.01); *H04B 1/3888* (2013.01); *H04M 1/04* (2013.01); *G10K 2210/108* (2013.01); *G10K 2210/3224* (2013.01)

(58) Field of Classification Search
CPC .............. G10K 11/175; H04B 1/3888; H04M 1/0202; H04M 1/19; G06F 1/1656; G06F 1/1613; H04N 5/2252; B65D 85/30
USPC ................ 455/3.02, 575.1; 725/63; 206/775; 348/376; 386/46
See application file for complete search history.

(56) References Cited

U.S. PATENT DOCUMENTS

| | | |
|---|---|---|
| 2002/0126010 A1 | 9/2002 | Trimble et al. |
| 2012/0092160 A1 | 4/2012 | Antonucci et al. |
| 2014/0152890 A1* | 6/2014 | Rayner ................. G06F 1/1626 348/376 |

OTHER PUBLICATIONS http://www.wired.com/2012/03/petraeus-tv-remote Mar. 15, 2012, 2pgs.

* cited by examiner

*Primary Examiner* — Phuoc H Doan
(74) *Attorney, Agent, or Firm* — Duane Morris LLP

(57) ABSTRACT

The subject matter herein field is for multiple and complimentary systems in the structure of a cellular device case so as to provide sound jamming and/or sound insulation, and/or powered noise cancellation as means of restriction the entry of useful sound into the microphone(s) of cellular smartphone devices, as a means of citizen counter-action of the "constant surveillance" characteristics inherent in the "always on," microphone systems as described under Background of the Subject matter, above.

20 Claims, 10 Drawing Sheets ical application: Application No. 62/060,
BATTERY-EQUIPPED CELLULAR TELEPHONE CASE WITH INTERNAL SOUND GENERATOR AND LAYERED SOUND BLOCKAGE FOR PRIVACY

CROSS REFERENCES

This application is a non-provisional application claiming priority of provisional application: Application No. 62/060, 111 entitled A BATTERY-EQUIPPED CELLULAR TELEPHONE CASE WITH INTERNAL SOUND GENERATOR AND LAYERED SOUND BLOCKAGE FOR PRIVACY filed Oct. 6, 2014. The entirety of the provisional is incorporated herein by reference.

BACKGROUND

Many modern cellular devices, particularly of the smartphone variety are sold at the retail level to consumers with the devices microphone pre-set in the "on" condition, which microphone remains in the "on" condition at the time of the line activation and transfer of possession to the consumer, in order to facilitate voice-activated algorithms which when so voice-activated allow the consumer voice-command access to a very wide array of account functions, Internet searches, and other data. Apple Inc.'s Siri, for example, was a pioneering innovation in the voice activated commands for cellular devices: Siri serves as an intelligence-emulating personal assistant and knowledge navigator which works as an application for Apple Inc.'s iOS, which uses a natural language user interface to answer questions, make recommendations, and perform actions by delegating requests to a set of Web services.

The Android OS system is, by percentage in the World Market, the most ubiquitous of the modern cellular smartphone devices. The newest examples of the Android smartphone system. Exemplified by the Samsung Galaxy S5, is currently sold with a pre-set voice listening and voice-activated system, so that, in cooperation with Google Inc., the utterance of a predetermined natural language phrase, in this instance "Okay Google" will automatically activate computer program algorithms such that when the so-equipped system "hears" such phase, transfer to account set-up or account activation will immediately ensue, which then equips the end user to issue the voice-activated commands of his or her choosing, in order to perform a wide variety of Internet functions.

In order to maintain a smartphone in the "always ready" sound-registry condition in which, for one example the "okay Google" system is sold (as integrated to the unit prior to the retail level) the system, as sold, operates with a microphone in the "always on" condition. Thus, when sold, such a so-configured phone registers all sounds, or at least all sounds within typical acoustic range of the human voice. The devices cannot be in a "ready" state for voice activated command-by-phrase without constant listening. All such microphone-received sounds, at least within the acoustic range of the human voice, are processed by a combination of hardware and the programmed command structure are excluded from algorithmic effect, and so that the intended phrase, in the current (at the time of this filing) Android/Google example, the phrase "Okay Google" is recognized, such that, when perceived by the machine, the programming steps intended by the end-user, such as a student researching a topic, are sent in motion. It is not possible for the machine (meaning the smartphone involved) to listen for the intended activation phrase, without being in a constant state of listening, to all voice sounds, a factor which is not always explained to the purchaser prior to the sales transaction.

The inherent nature of these "always on" voice-activated hardware/software systems in such so-equipped smartphones is to enable computer recognition of what is said, the translation of the recognized voice signal into digital format, and the broadcast of that digital copy of the voices(s) involved into a computer sever via the Internet, so as to allow the user experience to include the voice-activated commands designed into the system, thereby, spoken words within the acoustic perception range of the so-equipped smart phone, by the nature of the system, can be and in system operation are, transmitted to remote computers and computer-enabled recipients. Also, even with the huge gigabyte levels now publically known to be available on incredibly tiny chips, be programmed to retain all voice initiated data perceived by the machine, for an extended period of time equal to the memory capacity of the chip involved. Given that 256 gigabyte chips are not available at the public consumer electronics market (i.e. Lexar 256 GB SDXC Memory Card Professional Class 10 600X UHS-I), let alone as developed in the higher arts, the potential for life-of-unit-total perceived-sound retention exits, all in addition to the capacity for pre-transmission buffering and burst broadcast and, although labour-intensive, direct monitoring.

Public statements from military and intelligence officials (i.e. General Petraeus' statement on surveillance through appliances [http://www.wired.com/2012.03.petraeus-tv-remote], the whistleblower statements of former NSA senior administrator William Binney) it has long been in the public data, and covered on television and via Internet, that corporations and governmental bodies have long possessed the capacity to be remotely activate "smart" devices for intercept even when the unit involved gives the appearance of being in the "off" condition. Due to the copious public sources verifying this voice intercept potential even the most marginally intelligent person of evil motive cell phone prior to planning discussion, with the legitimate interception potential of such devices being thereby mitigated.

The above-described and rapidly evolving microwave cellular technology, brings with it the capacity destroy human "privacy" as all prior human civilizations, even the most totalitarian have previously understood the concept of "privacy." We have now entered an age where, due to this ubiquitous technology, no conversation within acoustic range of a cellular smartphone can be truly considered, by the participants in that conversation, to be truly private, meaning immune from interception. Given the ubiquitous cultural availability of cellular devices, the net effect of these entangled technological developments is that any conversation, anywhere, is subject to electronic intercept by the corporate and governmental entities having access to the devices involved. In addition, as has already occurred, automatic scanning technology can now be used by companies such as pan-global electronic information companies of the largest sort to achieve real time, or post-conversation access to such conversational content for supply to governmental entities for prosecutorial purposes. The distinction between major electronic media companies on the one hand, and state newspapers and intelligence services becomes difficult to parse when the former do the bidding, even if under threat, for the latter.

A primary goal of the within the subject matter is to provide systems and method which can be employed by those seeking retention of citizen privacy.

The subject matter here stated is for interdiction of the acoustic monitoring characteristics and potentials of the modern smart phone. As set forth in the Drawings and Claims herein, the subject matter works to limit sound pickup by cellular devices by multiple means which means can be overlapped to increase the effectiveness of sound blockage.

The undersigned caused to the filed application Ser. No. 13/594,230, as inventor of the subject matter therein, a Mobile Device Holder with Independent Power Source To Aid in the Location of a Mobile Device. This is believed to have been the first patent application filed for a battery equipped cellular telephone case, and said filings specifically referenced the use of such battery power in such case for the emission of light and sound. The application which has published is incorporated herein by reference.

The provisional application herein and now filed, being for a battery-equipped cellular telephone case with internal sound generator and layered sound blockage for privacy is also reliant a battery, including but not limited to a USB-rechargeable battery, for the provision of electricity to power a speaker on the inside of a cellular telephone case.

As more particularly discussed hereinafter, the subject matter herein field is for multiple and complimentary systems in the structure of a cellular device case so as to provide sound jamming and/or sound insulation, and/or powered noise cancellation as means of restricting the entry of useful sound into the microphone(s) of cellular smartphone devices, as a means of citizen counter-action of the "constant surveillance" characteristics inherent in the "always on," microphone systems as described under Background of the Subject matter, above. The powered subject matter here filed, and the complimentary sound insulation claims also here field, are illustrated in the Drawings which next follow, after which specific Claims are herein asserted.

These and many other advantages of the present subject matter will be readily apparent to one skilled in the art to which the subject matter pertains from a perusal of the claims, the appended drawings, and the following detailed description of preferred embodiments.

BRIEF DESCRIPTION OF THE DRAWINGS

Throughout the disclosure and claims, terms like cell phone, wireless device, mobile phone, mobile device, mobile appliance etc. are used. There use is interchangeable and no distinction is intended.

Figure 1:
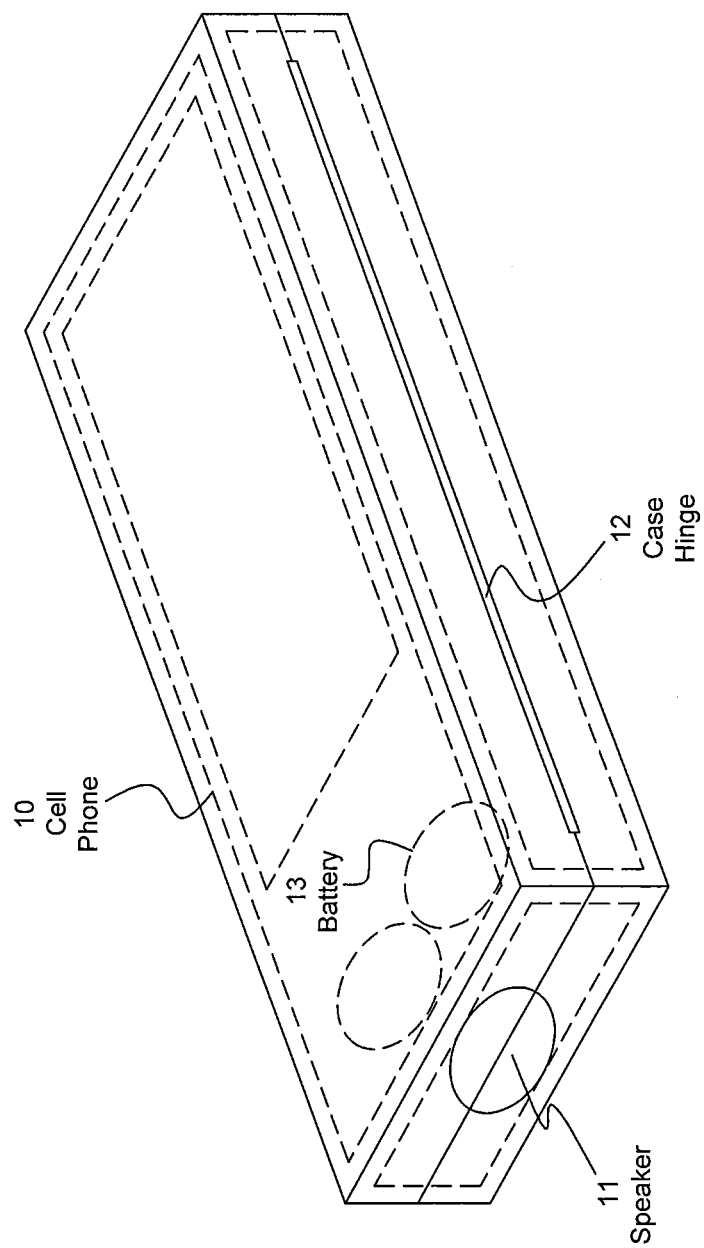
FIG. 1 illustrates a self-contained battery-powered case fitted with an interior speaker, with speaker sited so as to create a sonic "jam" in the interior of the case, with resulting sonic overwhelm of the ability of the microphone and other circuitry of the cellular device to capture and distinguish human speech originating from outside the case

FIG. 1 hereto shows a self-contained battery-powered case fitted with an interior speaker, with speaker sited so as to create a sonic "jam" in the interior of the case, with resulting sonic overwhelm of the ability of the microphone and other circuitry of the cellular device to capture and distinguish human speech originating from outside the case. The current subject matter is directed both for the placement of such internal speaker directly over the typical position of a smartphone microphone, and also for the placement of such an internally directed speaker within a smartphone case in other areas of the case, including over the speakers of the smartphone itself, in order to mover fully frustrate the sound capture capacity of a cellular smartphone or similar device as housed inside of the case. The subject matter is also directed or the use of interior-directed sound, in particular, or on the further basis that interior sound generation achieves substantial masking of sound signal, while doing so with less bulk than may be necessary to block sound by passive means such as insulation and sealing.

Figure 2:
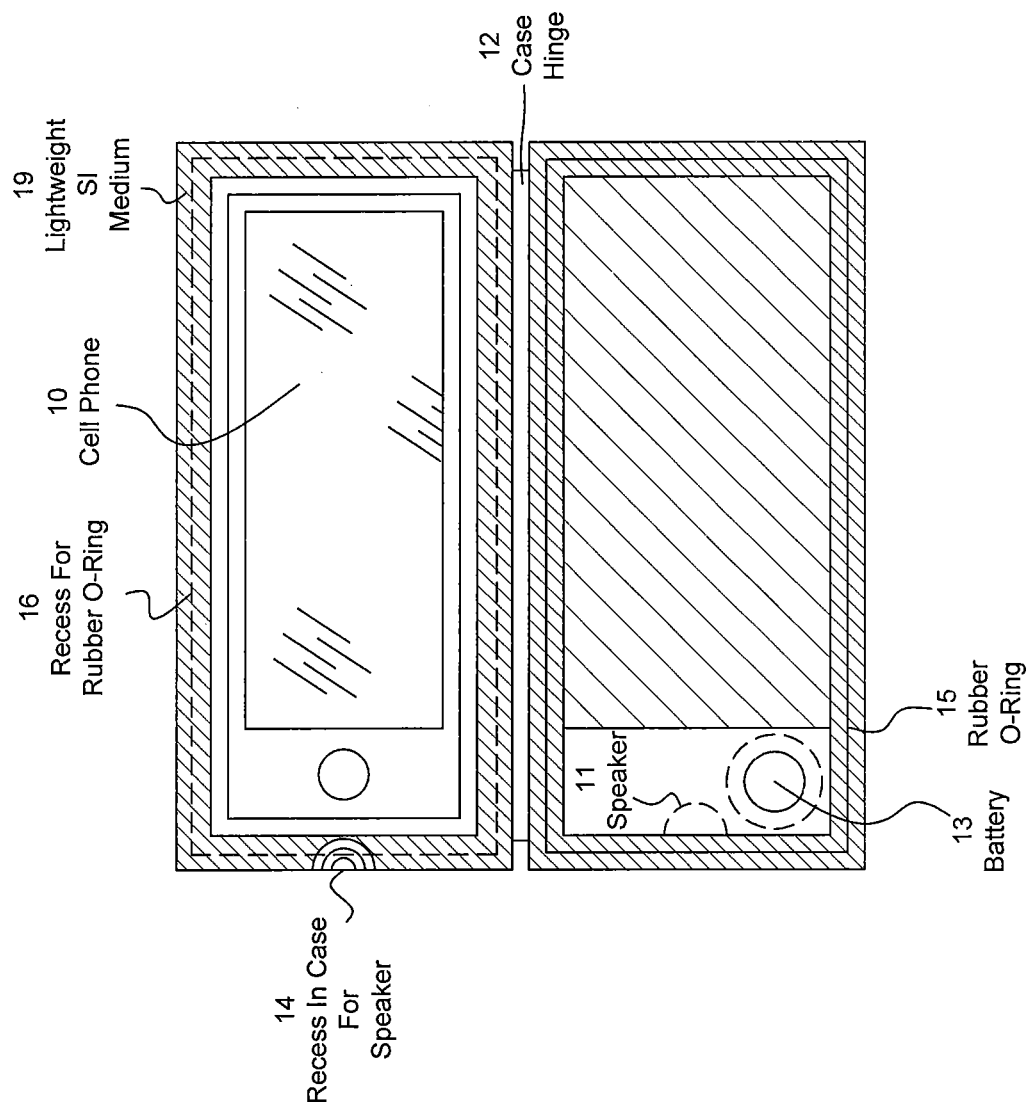
FIG. 2 illustrates a cellular smartphone case, in this instance configured in clamshell configuration, with smartphone contained therein.

FIG. 2 hereto shows a cellular smartphone case, in this instance configured in clamshell configuration, with smartphone contained therein, with the inclusion of sound deadening materials cushioning the smartphone, so that sound entry into the case is muffled by the insulation material, and by the presence of and O-ring in the closure areas of the case.

Figure 3:
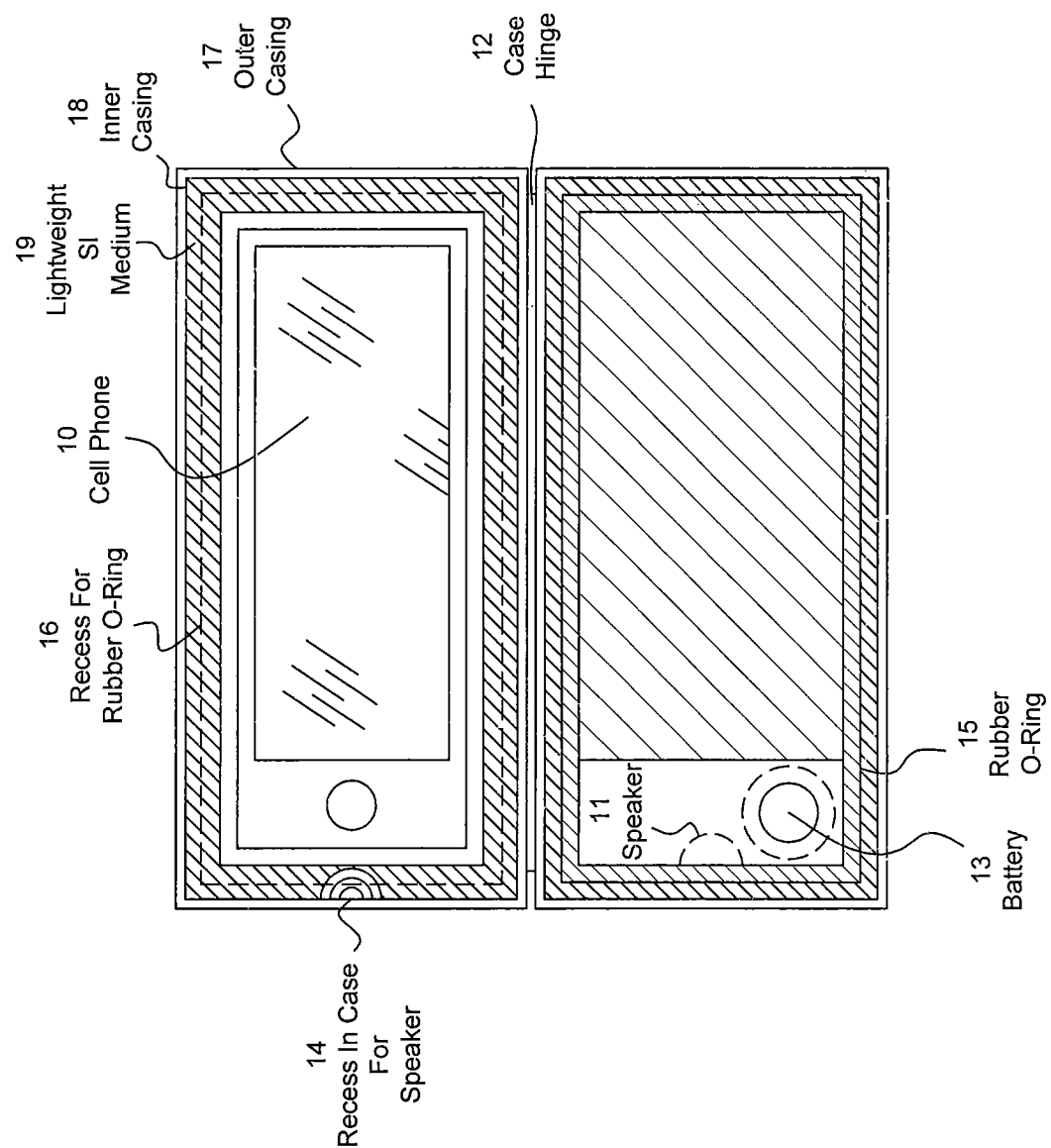
FIGS. 3 and 4 illustrate the cellular smartphone case as shown in FIG. 2 with an air gap build in the lid and box of the case, to further inhibit sound transfer into the smartphone contained in the case and cross section thereof.
Figure 4:
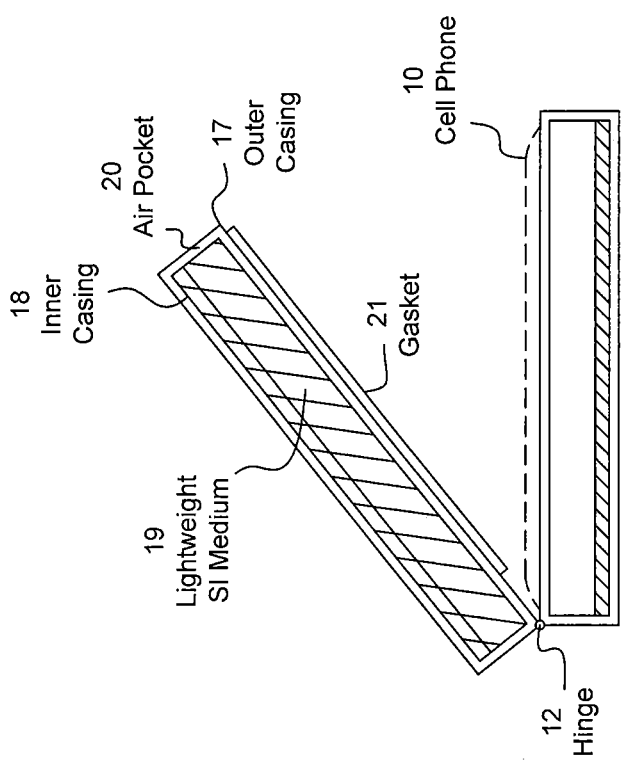

FIGS. 3 and 4 show a cellular smartphone case, in this instance configured in the clamshell configuration, with a smartphone contained therein, with sound-deadening materials cushioning the smartphone, so the sound entry into the case is muffled by the insulation material and by the presence of O-rings at the closure, but in addition with an air gap build in the lid and box of the case, to further inhibit sound transfer into the smartphone contained in the case.

Figure 5:
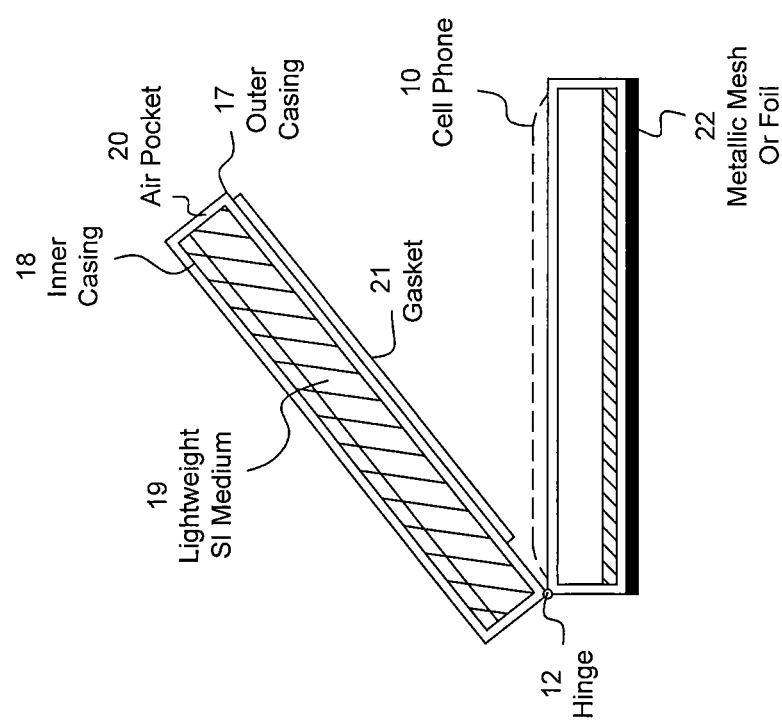
FIG. 5 illustrates a cellular smartphone case in clamshell configuration, with sound deadening materials cushioning the smartphone, so that sound entry into the case is thereby muffled, and also with a metallic layer of mesh or foil, so as to inhibit radio broadcast into or out of the case so constructed.

FIG. 5 shows a cellular smartphone case in clamshell configuration, with sound deadening materials cushioning the smartphone, also with an elastic, plastic or other strap installed into the case, so that the phone, once installed, will not fall out of the case in the instance of accidental opening of the case. so that sound entry into the case is thereby muffled, and also with a metallic layer of mesh or foil, so as to inhibit radio broadcast into or out of the case so constructed.

Figure 6:
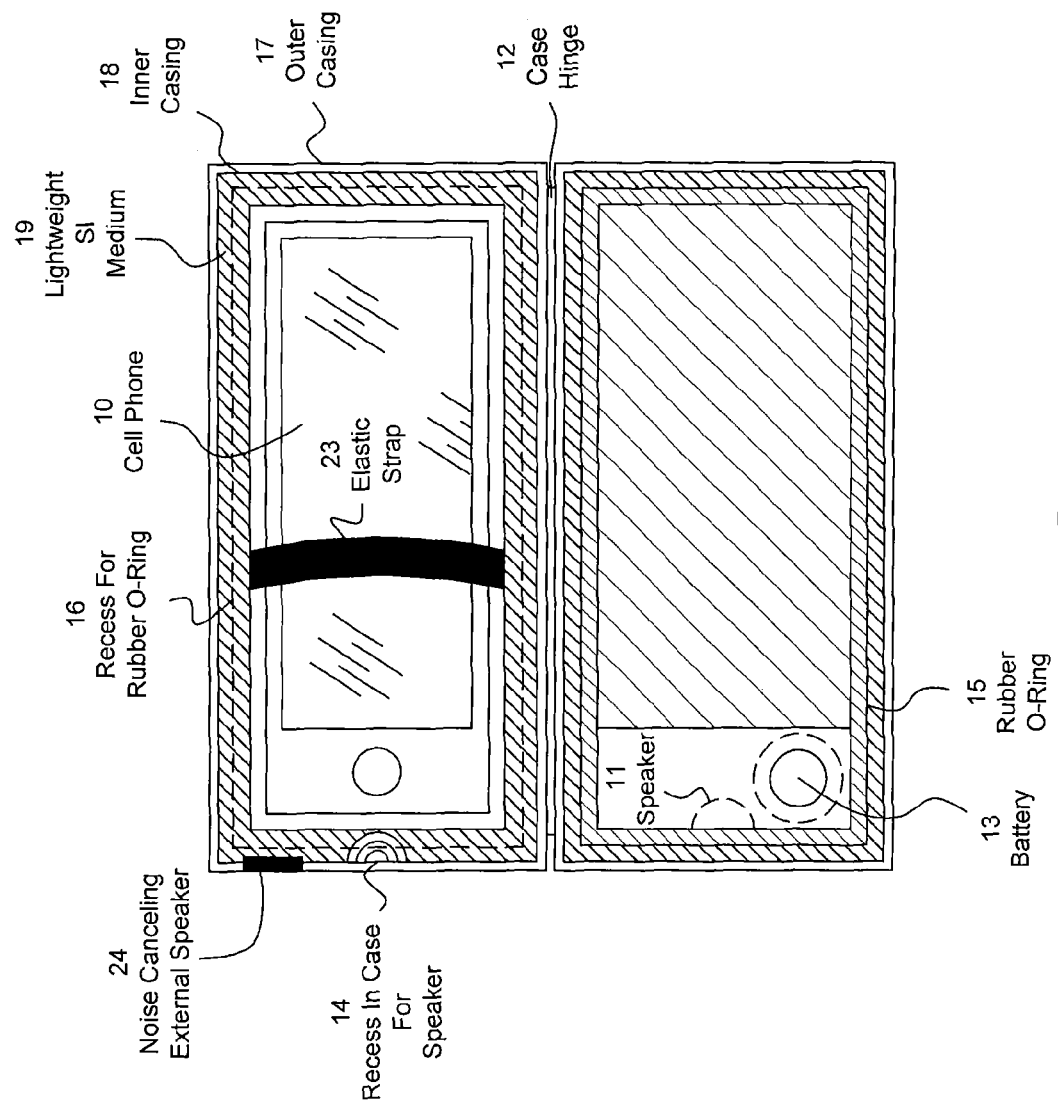
FIGS. 6 and 7 illustrate a cellular smartphone case in clamshell configuration, with sound deadening materials cushioning the smartphone, so that sound entry into the case is thereby muffled, with an elastic, plastic or other strap installed into the case, so that the phone, once installed, will not fall out of the case in the instance of accidental opening of the case. and also with a speaker system powered to broadcast active noise cancellation sound signals to the outside of the case, so as to further mitigate against entry of sound into the case.
Figure 7:
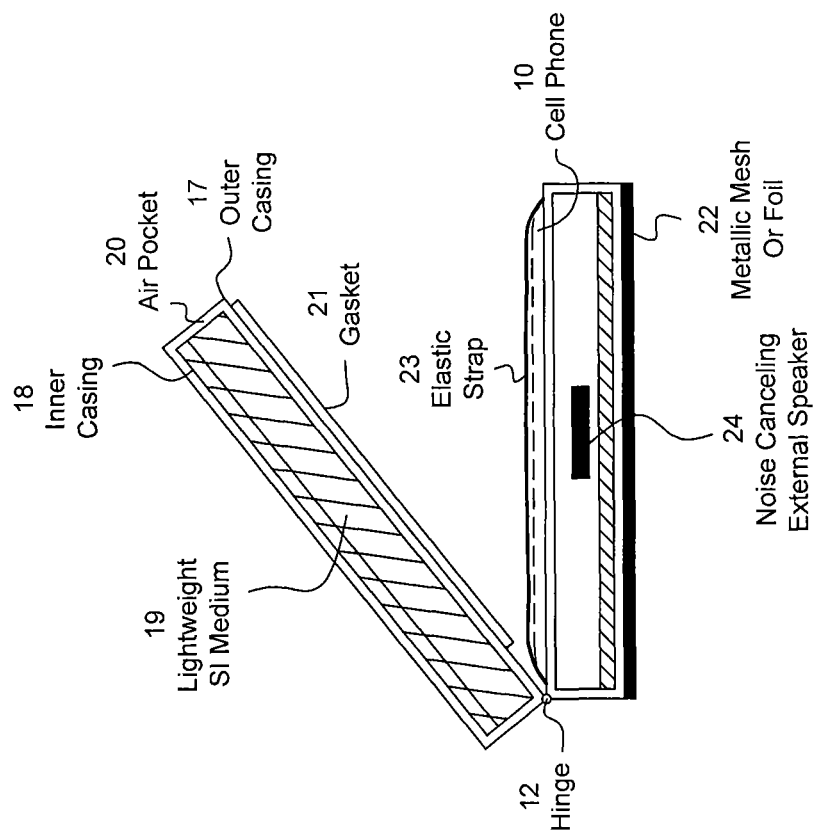

FIGS. 6 and 7 show a cellular smartphone case in clamshell configuration, with sound deadening materials cushioning the smartphone, so that sound entry into the case is thereby muffled, and also with a speaker system powered to broadcast active noise cancellation sound signals to the outside of the case, so as to further mitigate against entry of sound into the case.

Figure 8:
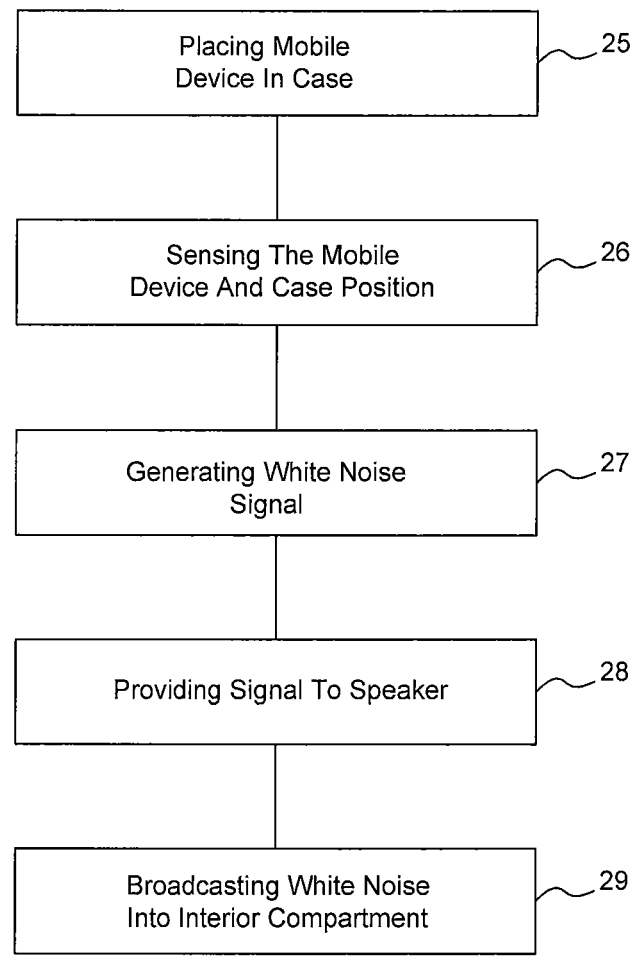
FIG. 8 is an illustrative flow chart for isolating a mobile device according to an embodiment of the current subject matter

Referring to FIG. 8, a method is shown shield a mobile device from exterior noise. The method includes placing the mobile device in an interior compartment of a case as shown in block 25. The case including an exterior shell preferably made with sound attenuating materials and structures such as baffles. The case having an open position and a closed position, the close position intended to protect and shielded the mobile device from surrounding noise, when the phone is not in use. A sensor senses that the mobile device in the case and that the case in the closed position and generates a status signal indication the presence of the mobile device and closure of the case as shown in block 26.

A processor, oscillator, crystal or memory device then generating a white noise signal as shown in block 27 and providing the white noise signal to a speaker as shown in Block 28. The speaker then broadcasts a resultant white noise from the speaker into the interior compartment of the case in response to the status signal the white noise signal as shown in block 29. The generation of a white noise signal may be as a result of mathematical model of expected environmental background, or may be predetermined and provided from an oscillator, crystal or prerecorded on a memory device, such as a flash memory, ram, rom etc. In preferred embodiments, the generation of a white noise signal is performed by a white noise signal generator integrated into the exterior shell of the case, and thus independent of any mobile device. In another embodiment the white noise signal is provided to the speaker of the mobile device and broadcasting the resultant white noise is from the mobile devices speaker into the interior compartment. Using the functionalities of the mobile device may be a cost effective approach, however, it is also envisioned all the functional elements are integrated into the mobile device case.

Figure 9:
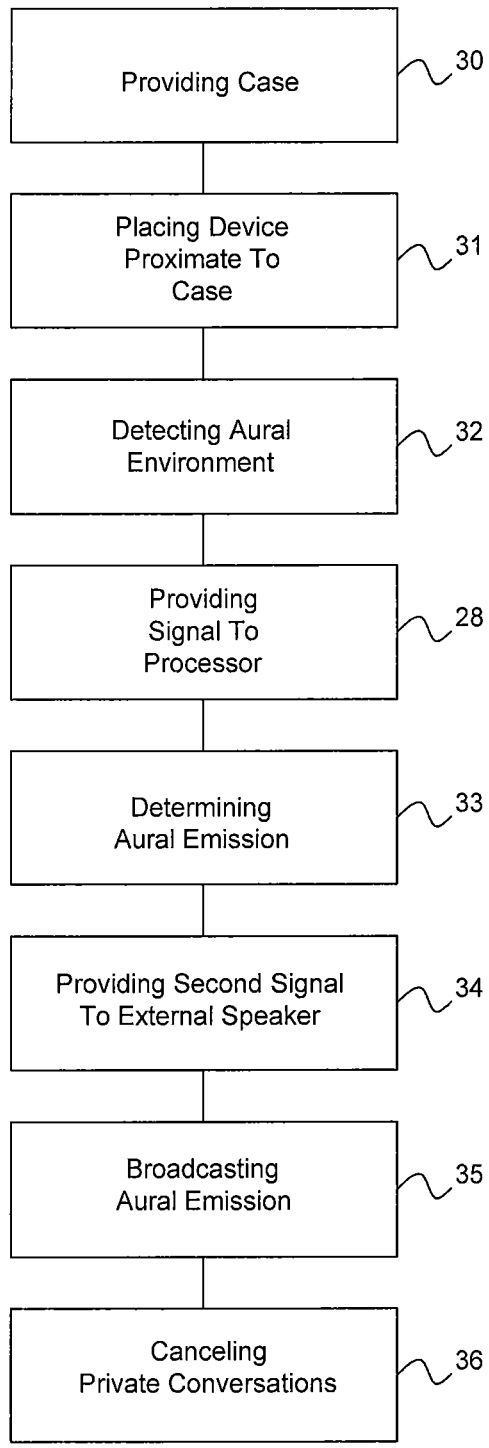
FIG. 9 is an illustrative flow chart for protecting a private conversation according to an embodiment of the current subject matter
Figure 10:
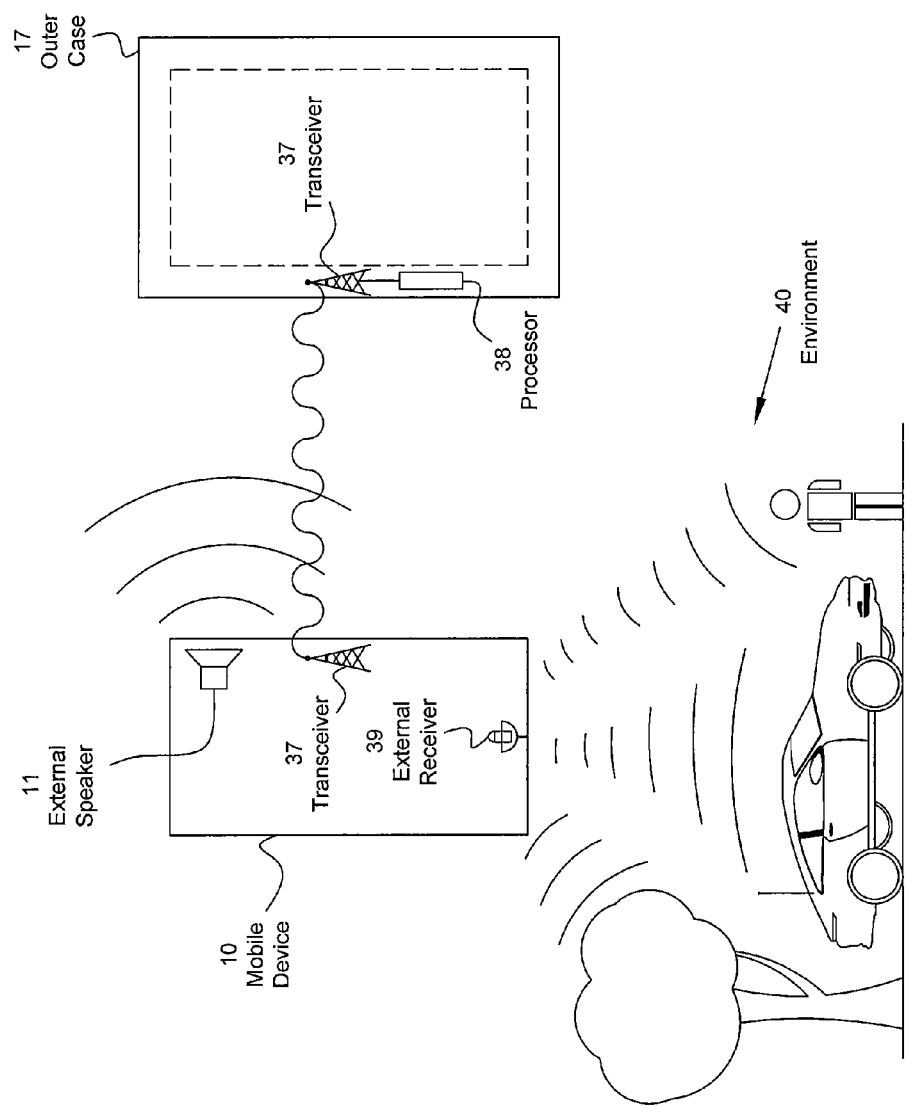
FIG. 10 is an illustration of communications between a mobile device and a mobile device case according to one embodiment of the current subject matter.

Referring to FIG. 9, a method of protecting private conversations from detection by a mobile device is shown. In the method a mobile device case having an external speaker, external receiver, power source and integrated processor is provided as shown in block 30. The mobile device is placed in or proximate to the mobile device case a shown in block 31. A receiver detects the aural environment proximate the mobile device case, the aural environment being the private conversation or other activities that are betrayed by characteristic sound, such as driving, intimate relationships etc. as shown in Block 32. A signal representative of the aural environment is provided to the processor as shown in block 28. Referring to FIG. 10, in one embodiment the signal may be sent from the mobile device 10 to a transceiver 37 on the case, via a direct or wireless connection. In this latter embodiment, the receiver 39 and/or the speaker 11 of the mobile device 10 may be utilized by the case in preforming the method.

Returning to FIG. 9; the processor within the case then determines an aural emission which would destructive interfere with the aural environment as shown in block 33, and provides a second signal to the external speaker reflective of the aural emission as shown in block 34. If as shown in FIG. 10, the case is utilizing the external speaker 11 of the mobile device 10, the second signal could be communicated via wire or wireless methods. The external speaker of the case, or the mobile device then broadcasts the aural emission as shown in Block 35 and cancels any private communications from being obtained by the mobile device as shown in Block 36.

The noise cancelling emission from the speaker need only interrupt the ability of the mobile device and or any unknown mobile device in proximity from accurately capturing the environmental sounds intended to be private and not cancel absolutely.

An aspect of the current subject matter provides for a self-contained battery-powered case, fitted with an interior speaker, with speaker sited so as to broadcast "white sound," "crowd noise," or other intermitted sounds, including end-user-recorded sounds, into the microphone of the therein contained smartphone, so as to create a sonic "jam" in the interior of the case, with resulting sonic overwhelm of the ability of the microphone and other circuitry of the cellular device to capture and distinguish human speech originating from outside the case. The term "battery-powered" herein includes, but is not limited to, USB charged batteries.

Another aspect of the current subject matter provides for a cellular smartphone case, in clamshell, slipover, or other configuration, with smartphone contained therein, with the inclusion of sound deadening materials cushioning the smartphone, so that sound entry into the case is muffled by the insulation material, and by the presence of an O-ring in the closure areas of the case.

It is also an aspect of the current subject matter provides for a cellular smartphone case, with a smartphone contained therein, with a sound-deadening materials cushioning the smartphone, so the sound entry into the case is muffled by the insulation material and by the presence of O-rings at the closure, but in addition with an air gap built into the lid and box of the case, to further inhibit sound transfer into the smartphone contained in the case.

Yet another aspect of the current subject matter provides for a cellular smartphone case in clamshell configuration with sound deadening materials cushioning the smartphone and sound entry into the case is thereby muffled, with a metallic layer of mesh or foil, so as to inhibit radio broadcast out of the case to constructed.

Still another aspect of the current subject matter provides for a cellular smartphone case in clamshell configuration, with sound deadening materials cushioning the smartphone, so that sound entry into the case is thereby muffled, and also with an elastic, plastic or other strap installed into the case, so that the pone, once installed will not fall out of the case in the instance of accidental opening of the case.

Still yet another aspect of the current subject matter provides for a cellular smartphone case with sound deadening materials cushioning the smartphone, so that sound entry into the case is thereby muffled, and also with a speaker system powered to broadcast active noise cancellation sound signals to the outside of the case, so as to further mitigate against entry of sound into the case.

Yet still another aspect of the current subject matter provides for a cellular smartphone case in clamshell configuration, with alternating lateral sound baffles parallel to the plane of the container, constructed so as to distort and deaden sound transfer based on principles similar to a pistol or rifle silencer, in addition to deadening materials cushioning the smartphone, so that sound entry into the case is thereby muffled.

While preferred embodiments of the present subject matter have been described, it is to be understood that the embodiments described are illustrative only and that the scope of the subject matter is to be defined solely by the appended claims when accorded a full range of equivalence. Many variations and modifications naturally occurring to those of skill in the art from a perusal hereof.

I claim:

1. A case for a mobile device, comprising:
    a sound inhibiting exterior shell defining an interior compartment for accepting the mobile device;
    a power source;
    an interior speaker powered by the power source and oriented to broadcast sound into the interior compartment;
    a microphone within the interior compartment in aural communication with the interior speaker via the interior compartment;
    a sensor operable to determine the status of the case being closed and in operable communication with the interior speaker;
    a signal generator operable connected to the speaker;
    wherein the interior speaker produces noise in response the signal generator and the sensor.

2. The case according to claim 1, further comprising a mobile device in the interior compartment and operably connected to the case.

3. The case according to claim 2, wherein the power source is the battery of the mobile device.

4. The case according to claim 2, wherein the interior speaker is the speaker of the mobile device.

5. The case according to claim 2, wherein the sensor is a sensor of the mobile device.

6. The case according to claim 2, wherein the signal generator is integrated into the exterior shell and operable connected to the mobile device.

7. The case according to claim 2, wherein the mobile device is wirelessly connected to the case.

8. The case according to claim 1, wherein the power source, interior speaker, signal generator and sensor are integrated into the exterior shell.

9. The case according to claim 1, wherein the exterior shell comprises two halves connected by an hinge and wherein in a closed position have a gasket positioned between the two halves proximate to an outer periphery of the two halves.

10. The case according to claim 1, further comprising an external receiver and an external speaker and a processor, the external receiver, external speaker are operably connected to the processor; the external receiver providing signals representative of external aural environment and the processor providing signals to the external speaker to destructively interfere with the external aural environment.

11. The case according to claim 1, wherein the external shell comprises electromagnetic shielding.

12. The case according to claim 1, wherein the external shell further comprises sound attenuating materials and baffles.

13. The case according to claim 1, further comprising a microphone within the interior compartment, the microphone being in aural communication with the interior speaker via the interior compartment.

14. A method of shielding a mobile device from exterior noise, comprising:
    placing the mobile device in an interior compartment of a case; said case comprising an exterior shell with sound attenuating materials having an open position and a closed position;
    sensing the mobile device in the case and the case in a closed position and generating a status signal;
    generating a white noise signal and providing the white noise signal to a speaker and broadcasting a resultant white noise from the speaker into the interior compartment of the case in response to the status signal the white noise signal.

15. The method of claim 14, wherein the step of generation a white noise signal is performed by a white noise signal generator integrated into the exterior shell of the case.

16. The method of claim 15, wherein the step of providing the white noise signal to a speaker and broadcasting the resultant white noise from the speaker into the interior compartment comprises communication the white noise signal to the mobile device and broadcasting from the mobile device the resultant white noise.

17. A method of protecting private conversations from detection by a mobile device comprising:
    providing a mobile device case having an external speaker, external receiver, power source and integrated processor;
    placing the mobile device proximate to the mobile device case;
    detecting the aural environment proximate the mobile device case with the external receiver;
    providing a signal representative of the aural environment to the processor;
    in the processor determining an aural emission which would destructive interfere with the aural environment;
    providing a second signal from the processor to the external speaker, said second signal representative of the aural emission;
    broadcasting from the external speaker the aural emission to an area proximate to the case; thereby cancelling private conversations from being detected by the mobile device proximate to the case.

18. The method of claim 17, wherein the external speaker, external receiver are contained within the mobile device and the steps of detecting the aural environment proximate to the mobile device case and broadcasting from the external speaker are performed by the mobile device.

19. The method of claim 18, wherein the set of providing a signal representative of the aural environment and providing a second signal from the processor are performed wirelessly between the mobile device and the mobile device case via respective transceivers.

20. The method of claim 17, wherein the power source, external speaker, external receiver and power source are integrated into the exterior shell.

* * * * *